United States Patent Office 3,359,154
Patented Dec. 19, 1967

3,359,154
POLYOLEFIN ADHESION
Melville A. J. Clark, North Brunswick, N.J., assignor to Union Carbide Corporation, a corporation of New York
No Drawing. Filed Aug. 31, 1962, Ser. No. 220,862
16 Claims. (Cl. 161—235)

ABSTRACT OF THE DISCLOSURE

Carboxylic acid modified polyolefin waxes containing an organic peroxide are incorporated in or coated on polymeric, metallic and cellulosic substrates to secure the adhesion of polyolefins to said substrates.

---

This invention relates to adhesion of polyolefin to itself and to other substrates. More particularly, it relates to method and composition for securing adhesion of polyolefin to itself and other substrates such as metal and decorative coatings.

Polyolefins, especially polyethylene and polypropylene are desirably adherent to themselves and to other substrates. For example, polyolefins can provide protective properties not equalled by any other synthetic thermoplastic polymer at comparable cost. Hence, polyolefins are the first choice of packagers for use as a protective film either as a self-supporting film or non-self-supporting film, i.e., coatings. The chief advantage of polyolefins is their inertness to chemical, atmospheric and solvent attack. Inertness, however, poses problems in packaging techniques by demanding for successful coating that a hot melt or a heated solvent solution be employed to place the polyolefin onto the substrate. Attempts to adhere self-supporting polyolefin film to substrates have heretofore required a virtually film destroying solvation or fusion of the polyolefin to secure adhesion.

This problem has been solved in the use of other thermoplastics such as poly(vinyl chloride) and poly(vinyl acetate) by priming the surface to be adhered with a substance exhibiting good adherence to both the thermoplastic and the substrate.

Heretofore, however, there has not been known a completely satisfactory and highly versatile "primer-type" adhesive composition tenaciously adherent to both polyolefinic and other substrates.

The rapid growth of polyolefins as packaging materials e.g. as packaging film, packaging material coatings and molded containers such as bottles, especially blow molded bottles, has stimulated much research into means for printing thereon pictorial and written descriptions of package contents and directions for use and brand identification. Coatings serving an informative and/or attractive function are herein termed "decorative coatings" and the term thus includes surface coloration whether or not coextensive with the coated surface, and lettered coatings, as well as coatings constituting pictures or symbols.

Attempts to achieve satisfactory decorative coatings have heretofore been stymied by the total inertness of polyolefin surfaces which has precluded adhesion of known printing materials. Efforts to overcome this problem have up to now been largely centered on removing the inherent inertness of the polyolefin surface. Thus, techniques such as corona discharge, irradiation, chromic acid treatment and others have been employed to make decorative coating of polyolefin film feasible.

The difficulty with these techniques is that they modify the single most important property of the polyolefin, and the reason why it is a good packaging material in the first place, namely its inert character.

It is, therefore, an object of the present invention to provide an adhesive composition which adheres tenaciously to polyolefinic, polymeric, metallic, cellulosic and other substrates. It is another object to provide an adhesive composition capable of being incorporated in polyolefins in very small amounts and imparting adhesive properties thereto. It is another object to provide an adhesive composition capable of being incorporated in cellulosic materials in very small amounts and imparting polyolefin adhesiveness thereto. It is another object to provide adhesive compositions which are solvent-free and water emulsifiable. It is another object to provide polyolefin compositions exhibiting adhesion to a wide variety of substrates. It is another object to provide method for imparting adhesive characteristics to polyolefins. It is another object to provide substrates exhibiting polyolefin adhesionability and method for the preparation thereof. It is another object to provide laminates of polyolefins and uncoated substrates. It is another and highly specific object to provide method for vacuum sealing polyolefins to various substrates rapidly and conveniently and without the use of special equipment.

It is another object to provide satisfactory decorative coatings on polyolefin surfaces. It is another object to provide method for satisfactorily decoratively coating polyolefin surfaces. It is another object to provide polyolefin surface receptive to decorative coating. It is another object to provide recorative coating adapted to adhere well to polyolefin surfaces. It is another object to provide decoratively coated polyolefin surfaces which are readily made adherent to a wide variety of polymeric, cellulosic, metallic and other substrates. It is still another object to provide laminates comprising a decoratively coated polyolefin surface and a substrate. Other objects will appear hereinafter.

It has been proposed to achieve adhesion of polyolefins to various substrates by bringing to the interface of the polyolefin and the substrate a carboxylic reagent modified polyolefin wax. Excellent adhesion is obtained to decorative, polymeric, metallic and cellulosic substrates. In certain environments, however, it has been observed that an undesirable degree of delamination can occur.

It has now been discovered that adhesion of polyolefins to various substrates with improved delamination resistance is achieved by bringing to the interface of the polyolefin and the substrate a carboxylic reagent i.e. a carboxylic acid, substituted carboxylic acid or carboxylic acid anhydride modified polyolefin wax and from 0.1 to 25 percent by weight preferably from 0.5 to 10 percent by weight of an organic peroxide.

In particular, it has been found that polyolefins can be adhered to themselves or to various substrates in the wax with the use of only a little heat where both a carboxylic reagent modified polyolefin wax and an organic peroxide are placed between the film and the substrate by either precoating the film with either or both or precoating the substrate. Alternatively, the modified polyolefin wax and organic peroxide can be incorporated in the polyolefin or in some cases in the substrate in an amount sufficient to provide improved adhesive wax on the surface and thus brought to the interface. The polyolefin then adheres when contacted with the substrate as a self-supporting film as in lamination and skin-packaging processing or as a non-self-supporting film as in extrusion coating, dip-coating, roller coating, spray coating, fluid bed coating and like techniques.

It has also been found that polyolefin surfaces can be decoratively coated, e.g. colored, uniformly or variegatedly, or printed with pictorial or literal information by placing between the polyolefin surface and the decorative coating a layer of a carboxylic reagent modified olefin polymer wax and an organic peroxide. This interposition can be accomplished by pre-coating the polyolefin surface prior to application of the decorative coating with the modified wax, or alternatively, the modified olefin polymer wax can be incorporated in the polyolefin prior to final fabrication and in an amount sufficient to ensure enough modified wax at the ultimate surface of the polyolefin to provide adhesion to the decorative coating, or, as a third alternative, the modified wax can be added to the decorative coating which will then comprise the modified wax, and conventional vehicles and colorants. In the last alternative, the decoratively coated portions of the polyolefin surface are potentially adherent to other substrates, notably other polyolefins and polymers, foils of aluminum and the like and cellulosic substrates, such as cardboard, cellophane and paper.

Organic peroxides useful in the present invention are, generally, compounds composed of carbon, hydrogen, and oxygen, and have the general formula $R^1OOR^2$ wherein $R^1$ is an organic radical and $R^2$ is an organic radical or hydrogen. $R^1$ and $R^2$ can be hydrocarbon radicals or organic radicals substituted with a great variety of substituents.

Preferred classes include aroyl peroxides e.g. benzoyl peroxide, acyl peroxides e.g. acetyl peroxide, and aryl substituted alkyl peroxides e.g. dicumyl peroxide. Specific compounds illustrative of these and other classes of organic peroxides are:

Cumene hydroperoxide
Di-tert-butyl peroxide
Dimethyl peroxide
Tetralyl hydroperoxide
n-Octyl hydroperoxide
Diethyl peroxide
t-Butyl hydroperoxide
t-Butyl perbenzoate
t-Butyl peracetate
Peracetic acid
Benzoyl peroxide
Dibenzoyl peroxide
Bis(p-chlorobenzoyl)peroxide
Cyclohexanone peroxide
Acetyl peroxide
Diacetyl peroxide
Hydroxyheptyl peroxide
Dibutyryl peroxide
Dipropionyl peroxide
Dioctanoyl peroxide
Dilauroyl peroxide
Diisopropyl peroxydicarbonate
Bis(heptafluorobutyryl)peroxide
Bis(2,4-dichlorobenzoyl)peroxide
p-Menthane hydroperoxide
Pinane hydroperoxide
Dicumyl peroxide
Di-t-butyl diperphthalate
t-Butyl peroxyisobutyrate
Methyl ethyl ketone peroxide
2,5-dimethylhexane-2,5-dihydroperoxide The adhesive compositions and adhering method of the present invention are advantageously employed with all normally solid polyolefins, e.g. those polyolefins having molecular weights of about 10,000 and above, whether crystalline or amorphous or partly each, and whether of high, low or intermediate density.

The term "polyolefin" is used in the present specification and claims to denote normally solid homopolymers of alpha olefins, compounds having the formula $$R\text{---}CH_2=CH_2$$

wherein R is hydrogen or an alkyl group, particularly an alkyl group having from 1 to 8 carbon atoms, and normally solid copolymers thereof with one or more other organic compounds copolymerizable therewith which contain polymer producing unsaturation, such as is present for example in carbon monoxide and formaldehyde and in compounds containing the ethylene linkage $>C=C<$ e.g. styrene, vinyl stearate, butene, vinyl acetate, vinyl formate, methyl methacrylate, monobutyl maleate, 2-ethyl hexyl acrylate, N-methyl-N-vinyl acetamide, methacrylic acid, ethyl acrylate, acrylic acid, isoprene, butadiene, acrylamide, vinyl triethoxysilane, bicycloheptene, bicycloheptadiene, divinyl phosphonate and the like. Many other copolymerizable monomers which can be used in addition to these illustrative compounds are well known to the art. Preferred polyolefins in this invention contain at least 50 percent by weight of a combined alpha olefin having from 2 to 4 carbon atoms inclusive, i.e. butene-1, propylene and especially ethylene.

The term "modified polyolefin wax" refers to low molecular weight waxes e.g. molecular weights from about 1000 to about 5000 of polyolefins as that term is defined in the paragraph next above which have been reacted with a carboxylic reagent as defined below. The method of preparation of the carboxylic reagent modified polyolefin waxes used in the present invention is in no wise critical. For example, these waxes can be prepared, in general, by reaction of a carboxylic reagent with a low molecular weight polymer polymerized directly to that weight, or a low molecular weight polymer for modification can be obtained by the pyrolysis or thermal degradation of a high molecular weight polyolefin e.g. a polyethylene having a density of from 0.88 to 0.97 and higher. Preferably a polyethylene to be pyrolyzed is substantially linear and has a density of 0.94 to 0.97 as the higher density polyethylene pyrolysis products provide the best adhesion after modification. The pyrolysis is conveniently carried out in a heated pyrolysis tube at about 450°–600° C. but can be effected in any known manner. The resulting waxes range in molecular weight from about 1000 to about 5000, and preferably from 1500 to 5000.

In a preferred method of preparing the preferred modified polyethylene waxes, a polyethylene wax having a density above about 0.94 and a molecular weight of from about 1500 to 5000 is blended in the liquid phase, i.e., in the melt or in solution with from 1 to 25 percent by weight of a carboxylic reagent e.g. maleic anhydride and reacted by being agitated therewith at temperatures of from about 130° C. to about 250° C. and preferably above 180° C. With lower density polyethylenes reaction temperatures of 80° C. and above are suitable. What is required is that the reaction mixture be agitatable. The blending and agitation can be carried out in any manner which insures intimate commingling of the reactants and good heat transfer throughout the reaction mass during the reaction time. For example, the polyethylene wax can be dissolved in an inert liquid organic solvent for the wax and carboxylic reagent such as toluene, xylene, cyclohexane, methylcyclohexane, iso-octane and chlorinated hydrocarbon solvents such as ortho-dichlorobenzene, 1,1,2-trichloroethane and α-chloronaphthalene. The dissolving of the polyethylene wax is most conveniently accomplished at temperatures above 110° C. in aromatic solvents for higher density polyethylenes.

It is preferred to effect reaction in the melt in the absence of an organic solvent by heating a high density polyethylene wax to its melting point (ca. 130° C.) and above, e.g. to 180° C. and stirring in from 5 to 15 percent, based on the wax, of carboxylic reagent e.g. maleic anhydride and continuing heating for 60–90 minutes. Temperatures of reaction either in solution or in the melt above about 250° C. confer no added benefit in speed of reaction or quality of modified wax obtained and, hence, will not be ordinarily used. The modification reaction can be effected under pressure to prevent undue volatilization of carboxylic reagent. The viscosity of the melted polyethylene waxes, e.g., 250–1000 centipoises at 200° C. is such that rapid stirring of the carboxylic reagent is easily accomplished. The exact manner or order of addition of the reactants is not critical. Any excess carboxylic reagent is removed after the reaction as by vacuum distillation or like technique.

By the term "carboxylic reagent" as used throughout the present specification and claims is meant an organic compound containing at least one carboxyl(—COOH) group and selected from the class consisting of (1) carboxylic acids such as unsaturated monocarboxylic acids having from 3 to 6 carbon atoms e.g. acrylic acid, crotonic acid, sorbic acid and the like; unsaturated dicarboxylic acids having from 4 to 10 carbon atoms, e.g. maleic acid, tetrahydrophthalic acid, fumaric acid, glutaconic acid, itaconic acid, and the like; (2) substituted carboxylic acids such as thioglycolic acid and (3) carboxylic acid anhydrides, such as anhydrides of the foregoing acids, and especially of the unsaturated dicarboxylic acids e.g. maleic anhydride. All of these carboxylic reagents are capable of undergoing an addition reaction to one or more olefinic linkages occurring in polyethylene waxes.

In one embodiment of the present invention adhesionability is imparted to polyolefins by incorporating a carboxylic reagent modified polyolefin wax containing organic peroxide mixture into polyolefin resins. The incorporation is conveniently effected by milling the modified polyolefin wax and the polyolefin together on a two-roll mill until the mixture is substantially homogeneous. Or the incorporating can be carried out in an extruder or any other mixing or compounding device known to the art for incorporating additives in thermoplastics. The amount of modified wax incorporated into the polyolefin will vary with the particular end use envisioned for the compounded resin e.g. the relative end use abuse the coating must withstand. Generally from 0.05 to 25, preferably from 0.1 to 10, parts by weight of the modified wax containing 0.1 to 25 percent by weight of an organic peroxide is sufficient to impart delamination resistant adhesionability to the polyolefin base resin. Particularly from 3 to 8 parts by weight of the modified wax containing 0.5 to 10 percent by weight of an organic peroxide per 100 parts by weight of the compounded polyolefin composition is desirable.

The modified wax organic peroxide mixture containing adherent polyolefin composition can contain as well colorants, modifiers, fillers, flame retardants and other conventional additives for thermoplastic resins in reasonable amounts. The polyolefin compositions containing the modified wax are formable by known techniques into films, sheeting, coatings and other contours all possessing adhesionability to various substrates including decorative coatings. Therefore, these compositions can be employed as "veneer" coatings on less impervious substrates, applied either as film or from the melt; or used as the "sandwich" layer in laminate constructions of similar or dissimilar polymeric, metallic, cellulosic, fibrous or non-fibrous substrates; or these compositions can be used as "primer" coatings to enable the adhesion of polyolefin to otherwise non-adhering substrates.

In another embodiment of the present invention adhesionability to polyolefins is imparted to cellulosic substrates by incorporating the modified wax organic peroxide mixture in the substrate. Incorporation of the wax is easily effected by adding a sufficient amount of wax to the slurry of cellulosic fibers to be formed into cardboard, paper and like cellulosic products. Coating of any substrate with a layer of modified wax organic peroxide mixture similarly imparts delamination resistant polyolefin adhesionability thereto. The application of the wax to substrate can be readily accomplished by use of a hot melt or solution of the wax and roller coating, dip coating, spray coating or otherwise contacting the substrate with the wax.

In another embodiment of the present invention adhesionability to polyolefin surfaces is imparted to decorative coatings, e.g. printing inks. In general, the printing ink compositions of the present invention are prepared by adding to conventional printing inks the carboxylic reagent modified olefin polymer waxes described herein.

Typical preparative techniques include fine grinding the modified wax e.g. in a micropulverizer, micronizer or pebble mill, and blending with the conventional ink ingredients e.g. one or more pigments or dyes and other modifiers in any convenient manner and at any time in the preparation of the inks. For example, the modified wax can be added to a pigment which is then let down to the desired viscosity by addition of some liquid, e.g. organic solvents such as aromatic hydrocarbons. Alternatively, the modified wax and pigment or dye can be pre-blended, e.g. by fluxing the modified wax on a two-roll mill, gradually adding and grinding in the pigment or dye and removing the blend obtained as a sheet or "pigment chip." Or a pre-blend can be made by incorporating the pigment or dye in a melt of the modified wax, as simply as by stirring to homogeneity, allowing the melt to cool and then handling as a pigment chip. If desired and advantageously with the modified waxes herein described, an aqueous emulsion of the wax can be prepared (as described below) and the emulsion blended with the pigment or dye. Preferably the pigment or dye is then added in some compatible liquid medium, e.g. water or alcohol. Also the pigment chips described above can themselves be emulsified and thus made into inks. In each of the foregoing techniques the conventional additives and modifiers for ink formulation can be present in the ink in the usual amounts. These additives and modifiers include among others fillers, modifying resins, driers, liquid carriers, flow control agents, and leveling agents.

The coloring compounds used in the modified ink compositions of the present invention are the conventionally used dyes and pigments. Examples of these compounds are pigments such as cadmium yellow, cadmium red, cadmium maroon, black iron oxide, titanium dioxide, chrome green, gold, silver aluminum and copper; and dyes such as alizarine red, Prussian blue, auramin naphthol, malachite green and the like.

The choice of ink formulation is widely variable and will be determined by the viscosity characteristics required by the particular printing method in which the ink is to be used. For example, flexographic inks, which are used to print on film have low viscosities, e.g. 22–25 seconds measured by a No. 2 Zahn cup, but silk screen inks, typically used to print on bottles and other containers, have very high viscosities e.g. 25,000 centipoises. Generally from 5 to 50 parts by weight, preferably from 15 to 35 parts by weight, based on solids, of the modified wax containing 0.1 to 25 percent by weight preferably 0.5 to 10 percent by weight of an organic peroxide is incorporated into 100 parts by weight of the commercially available inks.

The decorative coatings taught herein when contacted with the polyolefin surface can be in either the fluid state, as in normal printing, or the solid state as when the ink is supported prior to contact by adhesion to a substrate, which is then laminated via the ink or otherwise to the polyolefin.

Alternatively and advantageously the limitations of hot melt or solution application or incorporation can be avoided by use of a anionic, cationic or non-ionic emulsion of the modified wax mixed with organic peroxide as the coating mixture. Typically anionic water emulsions are prepared by melting together the carboxylic reagent modified polyolefin wax and a fatty acid such as, for example, formic, acetic, propionic, butyric, valeric, caproic, enanthylic, caprylic, pelargonic, capric, undecylic, lauric, tridecoic, myristic, pentadecanoic, palmitic, megaric, stearic, nondecylic, arachidic, behenic, carnaubic, hyenic, carborceric, cerotic, laccroic, melissic, montanic, psyllic, acrylic, crotonic, isocrotonic, vinylacetic, methylacrylic, tiglic, angelic, senecioic, hexenic, teracrylic, hypogeic, oleic, elaidic, erucic, brassidic, propiolic, propynoic, tetrolic, 2-butynoic, pentinoic, 2-pentinoic, amylpropiolic, palmitotic, stearolic, behenolic, sorbic, linoleic and linolinic acids. These acids have the general formula:

$$C_nH_{2n+(x)}COOH$$

wherein $n$ is an integer from 0 to 32 and $x$ is an odd number from $-5$ to $+1$ with the proviso that when $n=0$, $x=+1$. An amine soap is then added such as mono-, di- and triethanolamine, monoisopropanolamine, diisopropanolamine, triisopropanolamine, morpholine, N,N-dimethylethanolamine and N,N-diethylethanolamine. The mixture is stirred until thoroughly mixed or until it becomes clear. Water which has been heated to about 130° C. is added and the mass stirred under pressure. The mixture is then vigorously agitated in a suitable device, e.g., a bladed mixer, colloid mill or other shear producing apparatus to form the emulsion. A carboxylic reagent modified polyolefin wax solids content of from 5 to 50 percent is preferred in emulsions to be used as coating materials or in ink compositions.

The water emulsion of the carboxylic reagent modified wax is readily blended with an organic peroxide and incorporated into white water or the cellulosic fiber slurry in paper making or is easily coated onto the substrate by any of the conventional techniques including brushing, dipping, spraying, roller coating and the like. The water of the emulsion is evaporated either by allowing the coated-on emulsion to stand at room temperature or preferably by force drying as by air movement around and/or application of heat to the emulsion coating. Upon drying there remains a non-tacky and non-blocking coating which is easily heat activatable to be tenaciously adherent to polyolefins and numerous other materials.

A particularly desirable use of the compositions of the present invention is in simultaneously rendering more attractive and more adherent the polyolefin films used in "skin packaging," i.e. the formation of contoured containers for odd-shaped objects by drawing a vacuum on deformable film e.g. through holes in the surface of a relatively flat and rigid substrate member to bring the film over and around the object to be packaged. The film clings on contact and thereby simultaneously anchors and protects the packaged object. This packaging technique is described in U.S.P. 2,885,735 to Groth, for example. It is, of course, essential to obtain great adhesion between the film and the relatively rigid substrate member. The water emulsion of the carboxylic reagent modified wax is also readily blended with organic peroxide and mixed with both aqueous and alcoholic base pigment or dye inks and this mixture is easily coated onto or printed on a polyolefin substrate by any of the conventional techniques. The liquid of the emulsion is evaporated either by allowing the emulsion to stand at room temperature or preferably by force drying as by air movement around and/or application of heat to the emulsion. Upon drying there remains a non-tacky and non-blocking colored coating which is adherent to polyolefin surfaces and numerous other materials. It is critical at some stage of the application for all the decorative coatings of this invention to subject the coated surface to high temperatures e.g. 60° C. and higher for a brief period to secure maximum adhesion. The present invention provides a variety of means for securing this desired adhesion. First, the relatively rigid substrate member can be fluid coated with the modified wax or its emulsion; second the relatively rigid substrate member can be coated by laminating a surface coated film or a film of a modified wax organic peroxide mixture containing polyolefin; third, the deformable film can be fabricated from a modified wax organic peroxide polyolefin composition which is preferably homogeneous so that the modified wax is present on the film surface; and fourth, a cellulosic substrate can be fabricated from a modified wax organic peroxide containing composition. Each of these techniques provides good adhesion between the polyolefin film and the substrate. Each offers a processing advantage over the other. Coating of the film or substrate eliminates the need for compounding the resin. Blending the modified wax and organic peroxide with the polyolefin or substrate obviates the need for separate surface treatment of the film or substrate. The present invention provides an alternative means for securing this desired adhesion by printing on or coating the film or substrate with the compositions, especially the inks of this invention to promote adhesion as well as decorate the substrate. Heretofore, conventional printing inks have required use of an adhesive layer between the ink and the film. The printing ink compositions of this invention obviate the extra step by being themselves adherent to both substrate and polyethylene film.

It is a particular advantage of the compositions of the present invention that delamination does not occur around skin packaged articles.

Another desirable use of the compositions, structures and method of the present invention is the adhering of polyolefins to primed and unprimed metal. For example, polyolefins are highly suited chemically to use as bottle cap liners, e.g., in carbonated beverage containers. An adhesive capable of adhering polyolefins to cap tinplate has been lacking, however. The carboxyl reagent modified polyolefin wax organic peroxide laminate structures and compounded compositions taught herein, however, readily solve this problem, because the modified wax organic peroxide mixture is tenaciously adherent to both the primed or unprimed tin plate cap itself and to the polyolefin liner. Of course, the liner can contain the modified wax and organic peroxide, if desired, or the modified wax and organic peroxide can be coated on either surface to be adhered.

The present invention is illustrated by the following examples. All parts and percentages are by weight unless otherwise stated.

SOLVENT COATING COMPOSITIONS

*Example 1*

A maleic anhydride modified polyethylene wax was prepared by extruding a 0.96 density resin from a screw extruder through a hot tube 48 inches in length, having a diameter of three inches and fitted with an axially positioned 2⅞ inch diameter torpedo, at a rate of 32 pounds per hour. The torpedo was heated to 425° C.

Sixty pounds of the resulting wax was reacted with 6 pounds of maleic anhydride for 90 minutes at 220° C. in a 15 gallon autoclave equipped with a heating jacket, and a 6 inch turbine agitator. The reaction product was recovered by stripping the excess maleic anhydride under 5 mm. Hg pressure and removing the reaction product. The modified wax contained 2.1 percent carboxyl (calculated as succinic acid) and had a viscosity of 530 centipoises at 140° C.

This modified wax is dissolved in toluene to make a 1 percent solution. Benzoyl peroxide is added to a concentration of 3 percent based on the modified wax. The solution is warmed to 75° C. and while warm is applied to the smooth surface of corrugated paperboard by means of a doctoring rod. The coated paperboard is force dried by heating in an oven at 225° C. for 5 minutes. The cooled paperboard is then tested for polyethylene film adhesion by laminating a polyethylene film to the coated paperboard in a skin packaging machine. Molded phenolic bottle caps are packaged. The heaters of the vacuum former are set at 1200° F. Film heating time is 5–8 seconds. Attempts to strip the laminated film from the paperboard substrate at the edges of the laminate and around the bottle cap after slitting results in paper failure with no film to coating bond failure.

*Example 2*

The maleic anhydride modified polyethylene wax of Example 1 is dissolved in toluene to make a 1 percent solution. The solution is warmed to 75° C. and while warm applied by a doctoring rod to bare tinplate. The coated metal plate is baked at 300° C. for 10 minutes. The coated metal plates are then press-laminated with 10 mil film of 0.92 density polyethylene at 30 p.s.i. and 275° F. for 4 seconds. All attempts to remove the laminated film from the coated metal causes the rupture of the film itself. No film to coating bond failure occurs.

EMULSION COATING COMPOSITIONS-SUBSTRATE

Examples 3–7

An emulsion of water and maleic anhydride modified polyethylene wax was prepared as follows:

One hundred parts of a modified wax obtained as in Example 1 and containing 2.7 percent carboxyl (calculated as succinic acid) was mixed with 20 parts of morpholine, 20 parts of oleic acid and 40 grams of water. The mixture was charged to a pressure reaction vessel and heated with slow agitation to 125° C. The mixture was then rapidly agitated while the temperature was raised to 150° C. in 10 minutes.

The emulsion obtained was allowed to cool to 100° C. and an additional 260 parts of water was added. Heating to 145° C. and agitation were continued for 20 minutes. The emulsion was allowed to cool to 80° C. and was discharged.

In each of the examples the indicated amount of organic peroxide was added to a portion of the wax emulsion at room temperature and thoroughly dispersed by hand shaking.

In Examples 3 and 4 the organic peroxide was dicumyl peroxide and it was added as a 50 percent solution in toluene to concentrations based on the modified wax of 1 percent (Example 3), 3 percent (Example 4). In Examples 5 and 6 the organic peroxide was benzoyl peroxide and it was added as a 50 percent solution in benzene to a concentration based on the modified wax of 1 percent (Example 5) and 3 percent (Example 6). In Example 7 the organic peroxide was acetyl peroxide and it was added as a 25 percent solution in dimethyl phthalate to a concentration based on the modified wax of 3 percent.

A control, modified wax emulsion without organic peroxide, was also tested.

The delamination properties of the above formulations were tested by coating unbleached corrugated paperboard, using a #9 wire wound bar, with each formulation. The coatings were force dried for 5 minutes at 120° C. Polyethylene film was laminated to the coated paperboard in a skin packaging machine. Molded phenolic bottle caps were packaged. The heaters of the vacuum former were set at 1200° F. Film heating time was 5–8 seconds. The laminated film was in each instance attempted to be stripped from the paperboard substrate both at the edges of the laminate and around the bottle cap after slitting.

In Examples 3 and 6 there was a complete fiber failure; in Examples 4, 5 and 7 there was somewhat less fiber failure; in the control there was no fiber failure.

The delamination characteristics were evaluated by measuring the difference between the initial bond line on the substrate around the article and the bond line after 24 hours. In Examples 3, 4, 5, 6 and 7 the difference was about 1/16 inch or less, down to in Examples 3 and 6 no difference. In the control the difference was over 1/8 inch.

Example 8

One hundred grams of the modified wax prepared in Example 1 was mixed with 20 grams of morpholine, 20 grams of oleic acid and 300 grams of water. The mixture was charged to a pressure reaction vessel and heated to 150° C. with agitation for 1/2 hour and immediately cooled. There was obtained a translucent emulsion having a solids content of about 30 percent (31.9%). Benzoyl peroxide is added to a 3 percent concentration based on the modified wax.

One hundred grams of silk screen ink is added to 50 grams of the 30 percent solids modified polyethylene wax emulsion.

Mixing is by manual stirring. The ink thus prepared is applied to a high density polyethylene bottle exterior.

The bottle has been given no previous treatment to promote adhesion. Application is by wiping. Final ink coating thickness is typical of silk screen ink applications. The ink coated high density bottle is heated briefly by passing through a propane gas flame at 55 ft./min. Upon cooling and setting for 24 hours the ink coating samples are tested for ink adhesion first by laminating cellophane adhesive tape with hand pressure to the coated film surface and stripping it from the surface and second by drawing an abrasive scribe across the coated film surface.

The ink coating does not scratch. This shows the tremendous abrasion resistance of the printing ink compositions of this invention. The ink coating is not taken up by the cellophane adhesive tape upon its removal using a quick vertical pull showing the tenacious adhesion of the printing ink compositions of this invention. The above described ink coatings are easily buffed to a very high gloss.

Example 9

Example 8 is duplicated but substituting a flexographic ink for the silk screen ink and using 20 grams of the above benzoyl peroxide containing modified wax emulsion and 20 grams of the flexographic ink. Again excellent ink adhesion to the unmodified polyethylene surface is achieved as indicated by no lift off by cellophane adhesive tape and no scratch by the abrasive scribe.

Example 10

Example 8 is duplicated but substituting a silk screen vacuum forming ink normally used for poly(vinyl chloride) substrates for the silk screen ink. Printing is by the silk screen process onto 21 mil high density polyethylene sheet. After only air drying, the sheet, ink side out, is vacuum formed over a deep draw (4.5 inches) male mold. The vacuum forming operation provided the heat necessary to adhere the ink composition. Lift off and scratch characteristics are excellent as in Examples 3 and 4.

Example 11

Example 10 is duplicated but substituting polypropylene for the polyethylene. Results are excellent.

Example 12

An aqueous emulsion is prepared substantially as in Example 8 but containing only 5 percent solids is coated onto a high density polyethylene bottle. The coated bottle is then printed on with a silk screen ink. The printed bottle is oven dried at 170° F. for 15 minutes and then passed through a propane gas flame rapidly (50 ft./min.). Adhesion and scratch resistance when tested as above are found to be excellent.

Examples 13–17

Maleic acid modified waxes of the polymers containing organic peroxide of Examples 8–12 are tested and found to provide adhesion and abrasion resistance equal to maleic anhydride modified wax containing organic peroxide.

The ink formulations described herein can be used in the dual role of obtaining decorative effects and promoting adhesion of polyethylene film to normally nonadherent substrates.

Examples 18–20

In these examples corrugated paperboard (Example 18), clay coated paperboard (Example 19) and patent coated paperboard (Example 20) are printed on with each of the three inks of Examples 8–10. The so printed paperboards are then employed as the relatively rigid substrate in skin packaging. Ordinarily in skin packaging, an adhesive primer placed on the printed or decorated paperboard substrate and activated by the heat of the packaging film accomplishes the bonding. In these examples no adhesive primer is applied to the film or the paperboard substrate, in order to demonstrate that the minor proportion modified olefin polymer wax containing printing ink of the present invention promotes bonding. The articles to be packaged were plastic bottle caps. The packaging film is heated by radiant means for 5–8 seconds until it begins to soften. This film is vacuum drawn over the cap and paperboard substrate in the known manner. Vacuum is maintained for 5 seconds. After the assembly is cooled, adhesion is inspected by lifting the film from the substrate. Wherever the film contacted the printing ink of the invention, tenacious adhesion between the film and the paperboard substrate is developed as evidenced by deep paper failure when the film is lifted from the substrate.

In a control experiment the above procedure is duplicated but using the same printing inks without addition of the organic peroxide. The film parted easily from the paperboard substrates with no fiber failure occurring.

Similarly "blister packaging," the encapsulation of odd shaped objects between a preformed "bubble" of relatively rigid film and a relatively rigid substrate member, can be improved by the use of polyolefin film or sheeting as the bubble and modified ethylene polymer wax containing printing ink at the interface of the film or sheeting and the substrate. Also, the film can be printed on and adhered to an untreated substrate.

*Examples 21–23*

Examples 18–20 are duplicated but substituting a printed film and an unprinted substrate. Results are identical.

*Example 24*

A thioglycolic acid modified polyethylene wax was prepared by reacting 500 grams of a high density polyethylene wax, which had been prepared by pyrolysis of high density polyethylene at 475° C. and at a rate of 6 pounds per hour through a 1/32 inch annular clearance in a pyrolysis tube, with 36 grams of thioglycolic acid at 145° C.

An emulsion of the modified wax was prepared by melting together 20 grams of oleic acid, 100 grams of modified wax, and 20 grams of morpholine. The mixture was heated at 130° C. and 800 parts of water were added under pressure. The blend was then stirred vigorously under pressure at 150° C. to form the emulsion. Dicumyl peroxide is added as a 50 percent solution in toluene to a concentration of 10 percent based on the modified wax.

The emulsion is blended with a silk screen ink and coated onto low and high density polyethylene film in the manner of Example 8. Abrasion resistance and adhesion of the printing ink is excellent.

*Example 25*

A solution of the maleic anhydride modified polyethylene wax of Example 1 in toluene is mixed with acetyl peroxide and then with an organic base ink, and the mixture applied to polyethylene sheet. The ink is air dried. Adhesion is excellent.

Using the modified wax of Example 1, a mixture of 1, 5, 10 and 20 parts of the wax each containing 25 percent of dilauroyl peroxide and respectively 99, 95, 90 and 80 parts of polyethylene are prepared by fluxing the components in a mixer. The mixtures are extruded as films by the trapped bubble process cooled, slit and wound. The films obtained are printed on with commercial printing inks. Adhesion and scratch resistance are excellent as indicated by no lift off by cellophane adhesive tape or scratching from an abrasive scribe.

*Example 26*

A mixture of 50 grams of the modified wax emulsion of Example 8 and 100 grams of a flexographic ink is printed on unmodified low density polyethylene film. After air drying the decoratively coated film was used to line a quart mold cavity, printed side of the film facing in. A high density polyethylene bottle is then blown in the mold. There is obtained a printed polyethylene bottle having a protective film over the print.

EMULSION COATING COMPOSITIONS-FILM

*Examples 27–28*

A maleic anhydride modified wax prepared as in Example 1 and emulsified and blended with organic peroxide as in Examples 3–7 is applied at 15 percent (Example 27) and 30 precent (Example 28) solids concentration to 6 mil low density (0.92) polyethylene film. The coatings are air dried and then oven heated briefly to remove final traces of water. The coatings are of a thickness sufficient to give approximately one pound of wax solids per 1300 square feet of film surface. The coated films are laminated to commercial uncoated, unbleached, kraft lined unperforated corrugated board #125 test. "A" flute, on a skin-packaging machine. The production cycle is 6 seconds preheat of the film and a 6 seconds application of vacuum for a total cycle of 12 seconds. Good adhesion is obtained with all coated films. Uncoated, control polyethylene film does not adhere these conditions since such film can require as much as a 30 second preheat and a 30 second application of vacuum. Usually such long cycles are damaging to both paper and film and are commercially unacceptable from a cost standpoint.

INCORPORATED WAX COMPOSITIONS

*Example 29*

A maleic anhydride modified polyethylene wax was prepared as in Example 1. One part of the above-prepared maleic anhydride modified polyethylene wax is blended with 25 percent of diacetyl peroxide based on the wax and charged to a mixer with 99 parts of polyethylene (0.92 density) to make one percent concentration of the organic peroxide containing modified wax in the mixture. The mixture is extruded as a film from an annular die orifice and expanded by the trapped bubble process, cooled, slit and wound. The film obtained has a thickness of 5 mils and is laminated to each of the following substrates:

29A—Cold rolled steel
29B—Unprimed tin plate
29C—Phenolic resin primed tin plate
29D—Vinyl resin primed tin plate
29E—Aluminum foil (0.00125″) matte side
29F—Aluminum foil (0.00125″) gloss side for 4 seconds at temperatures of either 275° F. or 300° F. and pressures of either 30 pounds/square inch guage (p.s.i.g.) or 1000 p.s.i.g. The laminated structures are cooled to room temperature and the film is then attempted to be stripped from the substrate. The delamination test in Examples 29A, 29B, 29C, and 29D, is carried out by knife-scoring 1/4″ apart parallel lines through the film to the substrate and attempting to lift the 1/4″ wide resulting strip from the substrate. Delamination of the film from aluminum foil, Examples 29E and 29F, is attempted without scoring by pulling the film and foil in opposite directions. The adhesion rating scale is as follows:

Excellent—film strip ruptures before bond yields
Good—film strip offers strong resistance to removal
Fair—film strip offers slight resistance to removal
Poor—film strip does not adhere to substrate All of the film adhesion are found to be excellent.

SKIN PACKAGING

*Examples 30–32*

Using the 5 mil film of Example 29 bottle caps are skin packaged onto corrugated paperboard (Example 30), clay coated paperboard (Example 31), and patent coated paperboard (Example 32). Ordinarily in skin packaging an adhesive primer placed on the paperboard substrate and activated by the heat of the packaging film accomplishes the bonding. In these examples no adhesive primer was applied to the film or the paperboard substrate in order to demonstrate that the maleic anhydride modified polyethylene wax containing organic peroxide incorporated in the film is sufficient to accomplish bonding. The articles packaged are plastic bottle caps. The packaging film was heated by radiant means for 5–8 seconds until it begins to soften. This film is vacuum drawn over the cap and paperboard substrate in the known manner. Vacuum is maintained for 5 seconds. After the assembly cools adhesion is inspected by slitting the film around the bottle cap and lifting the remainder of the film. All bonds provided a sufficient degree of anchorage for the bottle cap.

*Examples 33–42*

The foregoing examples are duplicated but substituting for the polyethylene one of the following:

ethylene/carbon monoxide (94%/6%) copolymer;
ethylene/propylene (48%/52%) copolymer;
ethylene/propylene (89%/11%) copolymer;
ethylene/ethyl acrylate (79%/21%) copolymer;
ethylene/ethyl acrylate (94%/6%) copolymer;
ethylene vinyl acetate (5.6 mole percent vinyl acetate in feed) copolymer;
polypropylene;
polystyrene;
styrene/propylene copolymer;
poly(butene-1)

With each polyolefin, each embodiment of the present invention, incorporation of the modified wax and organic peroxide and coating with the modified wax and organic peroxide, either successively or simultaneously in or on the polyolefin or substrate provides a great improvement in adhesionability.

What is claimed is:

1. Method for securing adhesion of polyolefin film to a substrate which comprises incorporating from 0.1 to 10 parts by weight of a modified polyolefin wax having a molecular weight from 1500 to 5000 which has been modified by being reacted with a carboxylic reagent selected from the group consisting of unsubstituted, unsaturated monocarboxylic acids having from 3 to 6 carbon atoms, unsubstituted, unsaturated dicarboxylic acids having from 4 to 10 carbon atoms, thioglycolic acid and anhydrides of the foregoing acids containing from 0.1 to 25 percent by weight of an organic peroxide based on the wax in from 90 to 99.9 parts by weight of a film forming polyolefin to make 100 parts of a film forming adhesive polyolefin composition, and contacting said composition with said substrate.

2. Method claimed in claim 1 wherein the said composition is in the form of a film when contacted with the substrate.

3. Method claimed in claim 1 wherein said composition is contacted with the substrate by being coated thereon.

4. Method claimed in claim 3 wherein said composition is coated onto the substrate as a solution in a liquid organic solvent.

5. Method for rendering cellulosic substrates adhesive to polyolefins comprising incorporating in the cellulosic substrate a modified polyolefin wax having a molecular weight from 1500 to 5000 which has been modified by being reacted with a carboxylic reagent selected from the group consisting of unsubstituted, unsaturated monocarboxylic acids having from 3 to 6 carbon atoms, unsubstituted, unsaturated dicarboxylic acids having from 4 to 10 carbon atoms, thioglycolic acid and anhydrides of the foregoing acids and from 0.1 to 25 percent by weight of an organic peroxide based on the wax in an amount sufficient to provide modified polyolefin wax and organic peroxide at the surface of said cellulosic substrate which is to be adherent to a polyolefin.

6. Method for rendering self-supporting polyolefin film adherent to substrates which comprises placing on the surface of the film a coating comprising a modified polyolefin wax having a molecular weight from 1500 to 5000 which has been modified by being reacted with a carboxylic reagent selected from the group consisting of unsubstituted, unsaturated monocarboxylic acids having from 3 to 6 carbon atoms, unsubstituted, unsaturated dicarboxylic acids having from 4 to 10 carbon atoms, thioglycolic acid and anhydrides of the foregoing acids and from 0.1 to 25 percent by weight of an organic peroxide based on the wax.

7. Method for rendering substrates adherent to polyolefins which comprises placing on the substrate a coating of a modified polyolefin wax having a molecular weight from 1500 to 5000 which has been modified by being reacted with a carboxylic reagent selected from the group consisting of unsubstituted, unsaturated monocarboxylic acids having from 3 to 6 carbon atoms, unsubstituted, unsaturated dicarboxylic acids having from 4 to 10 carbon atoms, thioglycolic acid and anhydrides of the foregoing acids and from 0.1 to 25 percent by weight of an organic peroxide based on the wax.

8. A polyolefin composition exhibiting adhesiveness to polymeric, cellulosic and metallic substrates comprising per 100 parts 90 to 99.9 parts by weight of a polyolefin having a molecular weight above about 10,000 and from 0.1 to 10 parts by weight of a modified polyolefin wax having a molecular weight from 1000 to 5000 which has been modified by being reacted with a carboxylic reagent selected from the group consisting of unsubstituted, unsaturated monocarboxylic acids having from 3 to 6 carbon atoms, unsubstituted, unsaturated dicarboxylic acids having from 4 to 10 carbon atoms, thioglycolic acid and anhydrides of the foregoing acids containing from 0.1 to 25 percent by weight of an organic peroxide based on the wax.

9. Composition claimed in claim 8 wherein the polyolefin contains at least 50 percent by weight of a combined olefin having from 2 to 4 carbon atoms inclusive.

10. Composition claimed in claim 9 wherein the polyolefin wax is a polyethylene wax.

11. Composition claimed in claim 10 wherein the carboxylic reagent is maleic anhydride.

12. Composition claimed in claim 10 wherein the organic peroxide is benzoyl peroxide.

13. Composition claimed in claim 10 wherein the carboxylic reagent is dicumyl peroxide.

14. Composition claimed in claim 10 wherein the carboxylic reagent is acetyl peroxide.

15. Polyolefin surface receptive to printing inks comprising a polyethylene surface having thereon an ethylene polymer wax having a density of from 0.88 to 0.97 and a molecular weight from 1000 to 5000 which has been modified by being reacted with a carboxylic reagent selected from the group consisting of unsubstituted, unsaturated monocarboxylic acids having from 3 to 6 carbon atoms, unsubstituted, unsaturated dicarboxylic acids having from 4 to 10 carbon atoms, thioglycolic acid and anhydrides of the foregoing acids and from 0.5 to 10 percent by weight of an organic peroxide based on the wax.

16. In a laminate construction comprising a substrate layer and a polyolefin film layer, the improvement which comprises having at the interface of said layers a modified polyolefin wax having a molecular weight from 1000 to 5000 which has been modified by being reacted with a carboxylic reagent selected from the group consisting of unsubstituted, unsaturated monocarboxylic acids having from 3 to 6 carbon atoms, unsubstituted, unsaturated dicarboxylic acids having from 4 to 10 carbon atoms, thioglycolic acid and anhydrides of the foregoing acids and from 0.1 to 25 percent by weight of an organic peroxide based on the wax.

References Cited
UNITED STATES PATENTS

| | | | |
|---|---|---|---|
| 2,142,980 | 1/1939 | Huijser et al. | 260—85.3 X |
| 2,973,344 | 2/1961 | Fasce | 260—78.4 |
| 2,980,653 | 4/1961 | Johnson | 260—78.5 |
| 3,018,195 | 1/1962 | Kelly et al. | |
| 3,216,885 | 11/1965 | Schaufelberger | 260—28.5 X |
| 3,234,197 | 2/1966 | Baum | 260—78.5 X |
| 2,601,318 | 6/1952 | Navikas | 156—334 |
| 3,049,466 | 8/1962 | Erlich | 156—334 |
| 2,441,523 | 5/1948 | Ward | 117—161 |
| 2,547,358 | 4/1951 | Alexander | 117—161 |
| 2,293,844 | 8/1942 | Maxwell | 117—143 |
| 2,417,389 | 3/1947 | Whitner | 117—143 |
| 2,628,172 | 2/1953 | Jenett | 117—138.8 |
| 2,689,195 | 9/1954 | Martone | 117—138.8 |
| 2,984,583 | 5/1961 | Nagelschmidt | 117—72 |
| 3,007,809 | 11/1961 | Chadwick | 117—72 |
| 2,471,395 | 5/1949 | Keuffel | 117—12 |
| 2,538,378 | 1/1951 | Overton | 117—12 |
| 2,956,036 | 10/1960 | King | 260—28.5 |
| 3,001,964 | 9/1961 | Miller | 260—28.5 |
| 2,940,889 | 6/1960 | Justice | 161—247 |
| 2,970,078 | 1/1961 | Nielsen | 161—247 |
| 2,801,936 | 8/1957 | Bjorksten et al. | 117—138.8 |
| 2,825,662 | 3/1958 | McKay et al. | 117—138.8 |

JACOB H. STEINBERG, *Primary Examiner.*

EARL M. BERGERT, ALEXANDER WYMAN, *Examiners.*

L. T. PIRKEY, G. D. MORRIS, *Assistant Examiners.*